United States Patent [19]

James

[11] Patent Number: 5,272,425
[45] Date of Patent: Dec. 21, 1993

[54] A.C. MOTOR CONTROL

[75] Inventor: Lewis G. James, Clarence, N.Y.

[73] Assignee: Strippit, Inc., Akron, N.Y.

[21] Appl. No.: 681,311

[22] Filed: Apr. 2, 1991

[51] Int. Cl.⁵ .................................................. G05B 1/02
[52] U.S. Cl. ..................................... 318/606; 318/603
[58] Field of Search .............. 318/560, 561, 567, 599, 318/600–603, 606–608, 685

[56] References Cited

U.S. PATENT DOCUMENTS

| | | | |
|---|---|---|---|
| 3,562,619 | 12/1967 | Hyoguchi | 318/603 |
| 3,854,353 | 12/1974 | Cutler | 82/1 C |
| 3,906,324 | 9/1975 | Smith | 318/567 |
| 4,060,753 | 11/1977 | Okuyama et al. | 318/254 X |
| 4,099,109 | 7/1978 | Abbondanti | 318/603 X |
| 4,206,485 | 6/1980 | Sakamoto | 318/683 X |
| 4,357,569 | 11/1982 | Iwakano et al. | 318/661 X |
| 4,358,722 | 11/1982 | Iwakano et al. | 318/661 |
| 4,547,692 | 10/1985 | Spaulding | 318/592 |
| 4,710,865 | 12/1987 | Higomura | 318/594 |
| 4,741,210 | 5/1988 | Maus | 73/462 |
| 4,816,728 | 3/1989 | Kurakake | 318/568 |
| 4,891,568 | 1/1990 | Shibata et al. | 318/560 |
| 4,894,594 | 1/1990 | Kawamura et al. | 318/567 |
| 4,897,583 | 1/1990 | Rees | 318/254 |
| 5,013,989 | 5/1991 | Kurakake et al. | 318/625 |
| 5,053,688 | 10/1991 | Rees | 318/599 |

*Primary Examiner*—William M. Shoop, Jr.
*Assistant Examiner*—David Martin

[57] ABSTRACT

A low cost control system for precise positioning employs an a.c. motor and a variable frequency power source for the motor. When the desired position is approached, the frequency of the source is decreased to a low constant value, and the motor is stopped in timed relation to the leading edge of a feedback signal from a position responsive feedback sensor.

7 Claims, 1 Drawing Sheet

A.C. MOTOR CONTROL

FIELD OF THE INVENTION

The present invention relates to an a.c. motor control, and in particular to a low cost positioning system employing an a.c. motor for fine positioning.

BACKGROUND OF THE INVENTION

It is conventional to use servo motors for executing positioning functions, when precision is required. Such motors have substantial torque even at zero speed, so that small errors in position can be corrected by causing the servo motor to exert a sufficient torque in the required direction to reduce the error. Such motors are relatively expensive, and the control units for controlling and driving them are also relatively expensive.

Alternating current motors are relatively inexpensive, compared to servo motors, but they typically have very low torque at zero speed, so they have not been employed for precise positioning functions.

It is therefore desirable to provide a control system incorporating an inexpensive a.c. motor for executing precise position functions, instead of a more expensive servo motor and control system therefor.

SUMMARY OF THE INVENTION

It is a principal object of the invention to provide a control system for an inexpensive a.c. motor which is capable of precise position functions, without the requirement of complex and expensive control systems for controlling the motor.

It is another object of the present invention to provide such a system for positioning a member which has a relatively constant inertia.

A further object of the present invention is to provide such a system with an expensive feedback mechanism by which the position of the driven member may be brought to a stop precisely at a predetermined location, without a complicated and inexpensive control therefor.

These and other objects of the present invention will become manifested upon inspection of the following description and the accompanying drawings.

BRIEF DESCRIPTION OF THE DRAWINGS

Reference will now be made to the accompanying drawings in which.

DESCRIPTION OF THE PREFERRED EMBODIMENT

Figure 1:
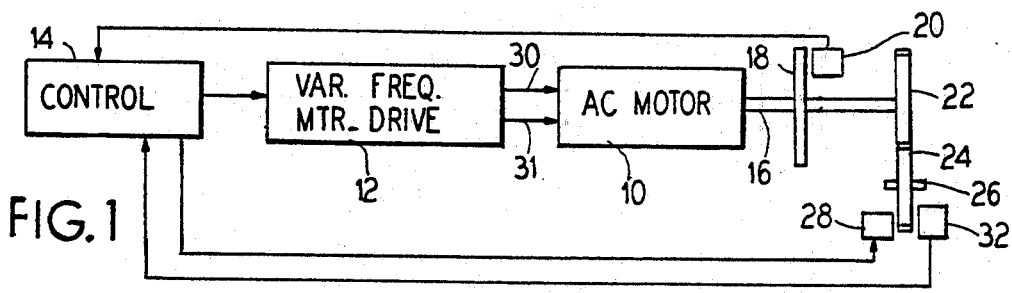
FIG. 1 is a functional block diagram of a system incorporating an illustrative embodiment of the present invention.

Referring now to FIG. 1, an a.c. motor 10 is connected to receive power from a drive unit 12, which is controlled by a control unit 14. The a.c. motor drives a shaft 16 to which is connected a feedback element 18, and a feedback sensor 20 is positioned in close proximity to the feedback element 18. The shaft 16 is connected to a driven member which, as illustrated in FIG. 1, is a gear 22, which may transmit motive power to a load via a meshing gear 24 rotatable on a shaft 26. A brake 28 is positioned in close proximity to the gear 24, so that its rotary position can be fixed when the brake 28 is energized. It should be understood that any driven member should be connected to the gear 24, or in place of the gear 24, and such connection may be direct, as shown between gears 22 and 24, or by means of a belt drive, chain and sprocket, or the like.

In operation, when it is desired to position the driven element 24, the brake 28 is released, and the a.c. motor 10 is powered by an a.c. voltage supplied by the drive unit 12 over lines 30 and 31. When such power is supplied, the a.c. frequency is increased by the drive unit 12 so that the a.c. motor 10 speeds up rapidly to a maximum speed, which is maintained for a given time, or, alternatively, for a given number of revolutions of the shaft 16, until shortly before the desired position of the driven member 24 is reached. Then, the speed of the a.c. motor is decreased, preferably linearly, to a small constant value, during which the control unit 12 inspects the output from the sensor 20. The sensor 20 emits a signal when the feedback element 18 is in a particular rotary position, and the control unit 12 thereupon issues a signal to the brake unit 28, after a predetermined delay. The amount of such delay is determined empirically, and is equal to the time required for the feedback member 18 to rotate from the position at which it is sensed by the sensor 20, to a final position, at the predetermined slow speed of the motor 10. The brake 28 supplies holding torque to hold the driven member at this position, without requiring any torque from the a.c. motor at zero speed.

A reference sensor 32 is associated with the driven member 24, and assists in recalibrating the system when necessary.

The system illustrated in FIG. 1 is conveniently employed in an environment where the driven member 24 has a constant predetermined inertia. For example, it is convenient to use the system illustrated in FIG. 1 in connection with rotation of a turret of a machine tool having a number of different tools or die-punch combinations which are brought into operative position by rotation of such turret. Since the mass of the turret and its associated tools is constant, the inertia is also constant and represents a fixed value. This makes it possible to determine the additional rotation of the a.c. motor 10 for a given delay interval, when it is rotating with a slow predetermined speed just prior to being stopped. Thus, the appropriate delay between sensing the signal from the feedback sensor 20 and energization of the brake 28, when the driven member 24 arrives precisely at its desired position, is fixed and determinable by simple experiment. The control unit 12 is programmed with such delay, so that a predetermined time is allowed to elapsed between the recognition of a position signal from the sensing unit 20, and the energization of the brake 28.

Figure 2:
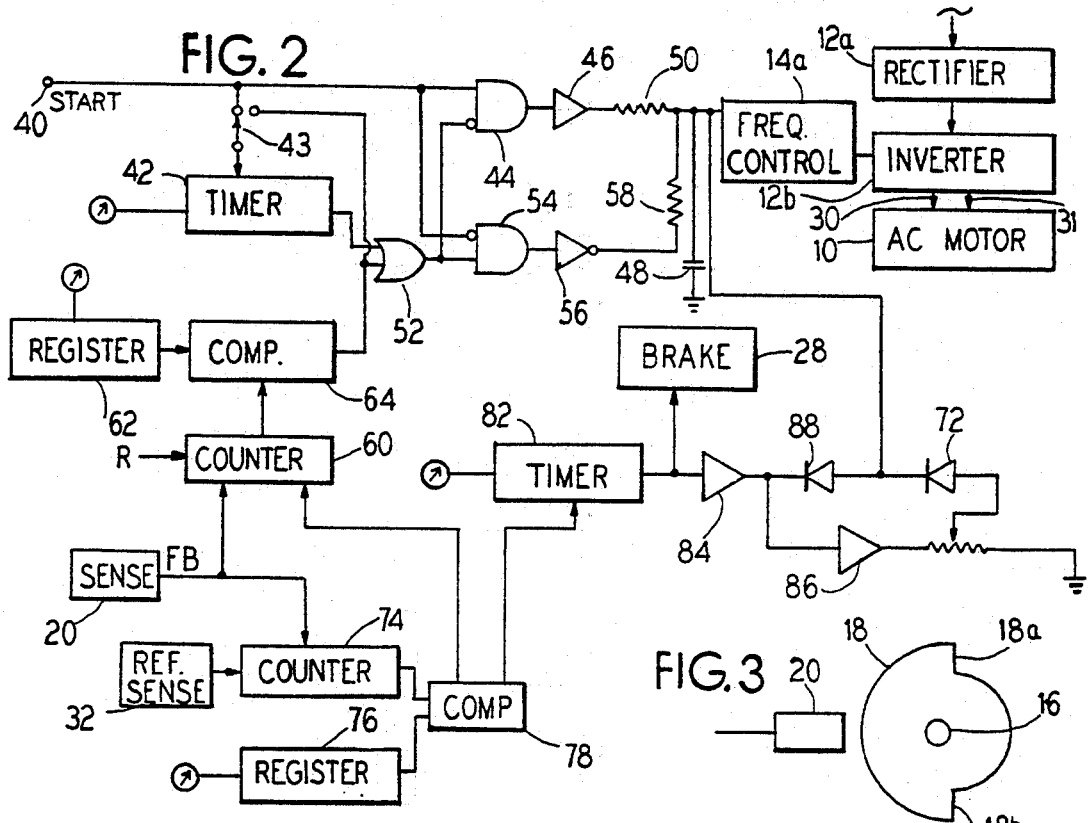
FIG. 2 is a functional block diagram of the control system of FIG. 1, showing greater detail.

Reference will now be made to FIG. 2, which illustrates a block diagram of a typical circuit which may be employed as a control unit 12.

Referring now to FIG. 2, the control and drive sections of the system are illustrated in greater detail. The drive section may be conveniently comprised of a rectifier 12a for producing d.c. from conventional line current, and an inverter 12b which is controlled in its frequency by a frequency control unit 14a. The inverter drives the a.c. motor 10 directly over the lines 30 and 31. The rest of the components of FIG. 2, make up of the feedback sensor 20 and the remainder of the control unit 14.

An operation is started by a high signal arriving at a start terminal 40 which starts a timer unit 42, through a switch 43. The timer has previously been preset to time out after a preset interval, referred to as the ramp-up time.

The start signal is applied through an AND gate 44 and an amplifier 46, and charges up a capacitor 48 through resistor 50. This represents an increasing signal applied to the frequency control unit 14a, so that the frequency of operation of the inverter 12b is increased to some maximum value, and maintained. When the time period of the timer 42 expires, a signal is produced by the timer 42 and passes through an OR gate 52 and an AND gate 54 to energize an inverter 56. This causes the charge on the capacitor 48 to be dissipated through a resistor 58. The AND gate 44 is disabled by a signal at the output of the OR gate 52, and the inputs of the AND gates 44 and 54 are cross-connected for mutually exclusive operation, so that charging and discharging cannot occur simultaneously.

The feedback sensor 20 provides a pulse for each revolution of the a.c. motor 16, and these are applied to the counting input of a counter 60, which is reset to zero prior to the start signal supplied to terminal 40. The output of the counter 60 is supplied to one input of a comparator 64, the other input of which is connected from a register 62, which has been preset with a parameter referred to as a ramp up distance. When the state of the counter 60 reaches the ramp up distance stored in register 62, the comparator 64 produces a signal which is passed through the OR gate 52 and initiates discharge of the capacitor 48 through the AND gate 54 and the inverter 56. Thus, the beginning of the discharge of the capacitor 48 is controlled either by the ramp up time of the timer 42, or the ramp up distance of the register 62. Whichever occurs first, will trigger the ramping down of the charge on the capacitor 48. By setting the ramp up time to a very large value, the ramp up distance is effectively selected as the only operative parameter, if desired. Similarly, by setting the ramp up distance to a very large value, the ramp up time is effectively selected as the operative parameter. Operating the switch 43 to the other position allows the timer to be started at the completion of the ramp up distance, so that the ramp up time is in effect added to the ramp up distance.

The minimum level to which the capacitor can be discharged is set by a potentiometer 70, the tap of which is connected through a diode 72 to the capacitor 48, to clamp the minimum voltage of the capacitor at a preset level, so that the a.c. motor 10 is caused to operate at a low constant speed, corresponding to the setting of the potentiometer 70, after the charge on the capacitor 48 is ramped down. This continues until the driven member reaches the desired position, which will now be described.

Pulses from the sensor 20 are also supplied to the counting input of a position counter 74, which is counted up or down, in response to direction of rotation of the motor 10 and the shaft 16, in a clockwise or counter-clockwise direction. For simplicity, a single input from the sensor is shown to the counter 74, and the counter is counted up or down in dependence on a signal from a comparator unit 78, over a line 79, which signal indicates the sign of motor rotation.

Figure 3:
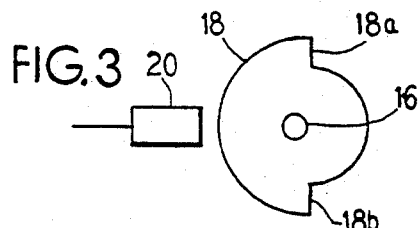
FIG. 3 is a plan view of a feedback element used in the embodiment of FIG. 1.
Figure 4A:
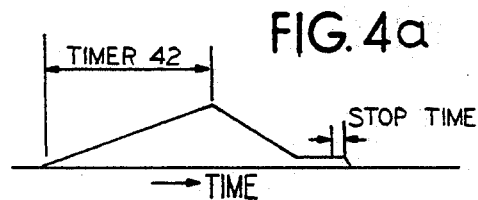
FIG. 4a,b,c, and d are diagram illustrating operation of the system.
Figure 4C:
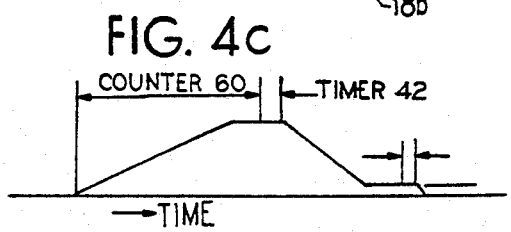
Figure 4B:
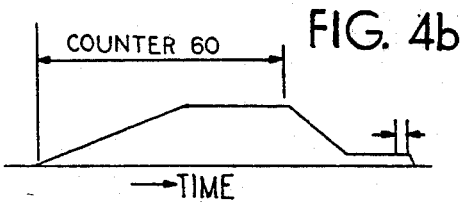
Figure 4D:
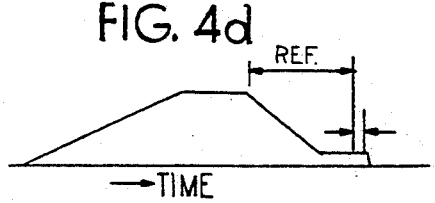

The desired position of the driven member is preset into a register 76, and the state of the counter 74 is compared with the value stored in the register 76 by the comparator 78. When the comparator 78 recognizes equality, a signal is produced which is applied to a timer 82. Thus, the instant that equality is reached, a signal is applied to the start input of the timer 82. This instant corresponds to a particular position of the feedback element 18, viz., when its leading edge is in proximity with the sensor 20. The interval of the timer 82 is previously set with a parameter referred to as a fine position interval. This time interval is initiated with the starting of the timer 82, and when it expires, the output of the timer 82 goes high, providing a high signal to the input of an inverter 84, the output of which is connected through an amplifier 86 to the potentiometer 70. Thus, the expiration of the fine position interval, the voltage at the output of the potentiometer 70 falls, so that the clamping effect of the diode 72 is removed. The fine position interval conveniently corresponds to the amount of rotation of ½ the width of the feedback element 18, so that the final position, at full stop, corresponds to the center of the element 18 juxtaposed with the sensor 20, for either direction of rotation. A feedback element is shown in FIG. 3, along with the sensor 20. The sensor produces a signal beginning with the leading edge 18a or 18b of the element 18, (depending on the direction of rotation, and this signal is used to count revolutions of the shaft 16, as well as to indicate precisely when the leading edge of the element 18 arrives at the sensor 20. Any commercially available position sensor may be used for the sensor 20, as well as the reference sensor 32.

The output of the inverter 84 is also connected by a diode 88 to the capacitor 48, so that at the expiration of the fine position interval, the capacitor 48 is immediately fully discharged, thus bringing the frequency to zero and stopping the a.c. motor. The brake 28 is also energized by an output from the timer 82.

If the position counter 74 looses synchronism with the position of the driven member for any reason, the motor may be controlled manually (by means not shown) until a reference sensor 32 is operated. The sensor may be, for example, located at a particular position relative to the driven member 24, and at that time the position counter 74 may be reset to the correct value corresponding to that position. This re-establishes synchronism between the value in the position counter and the current position of the driven member.

FIG. 4 shows four graphs of the velocity of the a.c. motor 10, and the frequency of its power supply, versus time. In the operation depicted in FIG. 4a, the timer 42 initiates the reduction of motor speed to a low constant value, after which the motor is stopped in response to operation of the sensor 20, as described above. In the operation depicted in the FIG. 4b, it is the counter 60 that initiates the speed reduction. In the operation depicted in FIG. 4c, the switch 43 is operated so that the timer 42 is started not by the start signal at terminal 40, but by operation of the counter 60 via the comparator 64, so that the delay of the timer 42 is added to the effective value of the parameter stored in the register 62. This allows a fine adjustment of the time at which the down ramp starts, so that the length of time that the system is held in its constant low speed condition is at a minimum, for the maximum speed of operation. In FIG. 4d, the leading edges of the reference feedback element 32 initiates the speed reduction, and the trailing edge thereof initiates the stop operation. The operations of FIGS. 4c and 4d represent optimal variations of the operation previously described.

It will be apparent that the control unit illustrated in FIG. 2 is merely exemplary, and that other control units may be employed for controlling the frequency of the power supplied to the a.c. motor 10.

The components shown in FIG. 2 may be constructed of digital circuits as analog circuits, if desired. Likewise, the timing elements may be clocked counters, or adjustable one shot multivibrators, etc. Preferably, the operations of the components are performed by a microprocessor, having a stored program which executes the various operations in timed sequence.

It is apparent that other modifications and additions may be made in the apparatus of the present invention without departing from the essential features of novelty thereof, which are intended to be defined and secured by the appended claims.

What is claimed is:

1. A positioning system for a machine tool comprising, in combination, a source of variable frequency a.c. power, an a.c. motor connected to said source and adapted to move the position of a driven member, feedback means juxtaposed with said driven member for supplying a position signal, control means for controlling the frequency of said variable frequency source to control the speed of said a.c. motor, said control means being connected to receive said position signal, said control means incorporating means for increasing said frequency and later decreasing said frequency to a constant low frequency, and means connected to said feedback means for stopping said a.c. motor at a precise position of said driven member in response to said position signal.

2. Apparatus according to claim 1, wherein said control means includes counter means for counting the number of revolutions of said a.c. motor and means responsive to said counter means for initiating a decrease in said frequency in response to a predetermined number of revolutions being counted.

3. Apparatus according to claim 1, in which said control means includes timer means for timing an interval during which said a.c. motor is rotating, and means for initiating a decrease in said frequency in response to said timer means.

4. Apparatus according to claim 1, wherein said control means produces a control signal for initiating an increase in said frequency for initiating movement of said motor.

5. Apparatus according to claim 1, wherein said control means includes means connected to said feedback means for introducing a predetermined delay in said position signal following the time when said driven member reaches a predetermined position, and means for stopping said a.c. motor at the expiration of said delay.

6. Apparatus according to claim 1, wherein said feedback means comprises a proximity switch.

7. A positioning system for a machine tool comprising, in combination, a source of variable frequency a.c. power, an a.c. motor connected to said source and adapted to move the position of a driven member, feedback means juxtaposed with said driven member for supplying a position signal, control means for controlling the frequency of said variable frequency source to control the speed of said a.c motor, said control means being connected to receive said position signal, said control means incorporating means for increasing said frequency and later decreasing said frequency to a constant low frequency, and means connected to said feedback means for stopping said a.c motor at a precise position of said driven member in response to said position signal;

wherein said control means includes counter means for counting the number of revolutions of said a.c motor and means responsive to said counter means for initiating a decrease in said frequency in response to a predetermined number of revolutions being counted;

and wherein said control means includes a timer means for timing an interval, beginning when said predetermined number of revolutions have been counted, and said means for initiating a decrease in frequency is responsive to the expiration of said interval.

* * * * *